United States Patent
Hrle et al.

(10) Patent No.: US 7,693,875 B2
(45) Date of Patent: Apr. 6, 2010

(54) METHOD FOR SEARCHING A DATA PAGE FOR INSERTING A DATA RECORD

(75) Inventors: Namik Hrle, Boeblingen (DE); Johannes Schuetzner, Boeblingen (DE); James Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 11/620,187

(22) Filed: Jan. 5, 2007

(65) Prior Publication Data

US 2007/0168640 A1   Jul. 19, 2007

(30) Foreign Application Priority Data

Jan. 9, 2006   (EP)   .................. 06100154

(51) Int. Cl.
*G06F 12/00* (2006.01)
*G06F 17/30* (2006.01)
*G06F 9/26* (2006.01)
*G06F 9/34* (2006.01)

(52) U.S. Cl. ................. 707/200; 707/205; 711/221

(58) Field of Classification Search ............ 707/2, 707/8, 200, 3; 709/203, 223; 711/163
See application file for complete search history.

(56) References Cited

U.S. PATENT DOCUMENTS

| | | | | |
|---|---|---|---|---|
| 5,983,329 A | * | 11/1999 | Thaler et al. | 711/163 |
| 6,377,958 B1 | * | 4/2002 | Orcutt | 707/200 |
| 7,113,936 B1 | * | 9/2006 | Michel et al. | 707/2 |
| 7,403,945 B2 | * | 7/2008 | Lin et al. | 707/8 |

* cited by examiner

*Primary Examiner*—Apu M Mofiz
*Assistant Examiner*—Susan Y Chen
(74) *Attorney, Agent, or Firm*—Grant A. Johnson

(57) ABSTRACT

A method of searching a data page in a table space of a database for inserting a data record to a first table, wherein the table space comprises space map pages and sets of data pages, wherein each space map page comprises information about the available storage space of one set of data pages, wherein each space map page and the corresponding set of data pages is further assigned to a table range for each table to which at least one data page in the set of data pages belongs to, wherein the database further comprises a clustering index for the first table in the database management system, wherein the database management system comprises a space usage information database, and wherein the space usage information database holds space usage information for each table range.

11 Claims, 2 Drawing Sheets

METHOD FOR SEARCHING A DATA PAGE FOR INSERTING A DATA RECORD

FIELD OF THE INVENTION

The invention relates to database management systems in general and to a method of searching a data page in a table space of a database for insertion of a data record in particular.

BACKGROUND AND RELATED ART

A database system consists of a database and a database management system (DBMS). A database is an organized collection of data. A special type of a database is a relational database. In a relational database, the collection of data is organized into tables that consist of rows and columns of data. A row of data in a table is also referred to as a data record. The table columns can have a fixed length or a varying length. If at least one of the columns of a table has a varying length or if the table is compressed, then the data records can also have a varying length. A relational database typically consists of many tables and each table generally contains multiple rows and columns. Tables are the logical objects that applications that access a database perceive.

A database management system is a computer program which is employed to manage and query a database. A relational database management system is a special kind of database management systems which is used to manage and administrate a relational database. It is a database management system that employs relational techniques for storing data in and retrieving data from a relational database.

Table spaces are the physical objects in which the data is stored. A table space contains one or more tables and is typically divided into a plurality of data pages and into several space map pages. Each data page belongs to a single table only. In a multi-table table space, each space map page may cover data pages that belong to different tables. However, for a single-table table space, each space map belongs to a single table only. In many cases the data pages of a table are co-located in so-called segments, which contain data pages of a single table only. A space map page covers data pages of one or more segments. All data pages within a single table space are characterized by the same page size. Data in form of data records is stored in one of the data pages, usually on a single data page. A data page can contain one or more data records. Each space map page of the table space relates to a fixed number of data pages. The fixed number of data pages to which a space map page relates to is also called a set of data pages. A space map page maintains free space information on the corresponding set of data pages. Database systems exploit the space map pages in order to identify data pages that provide enough storage space for additional data records to be inserted. In order to avoid excessive updates of the space map pages and in order to maximize the number of data pages covered by a single space map page, each space map page maintains only a small number of values that approximate the amount of available storage space of a data page. Thus the space information provided by the space map page is not completely accurate. In a table space, a space map page usually precedes the data pages that it covers. Instead of a single space map page, a set of data pages may also be covered by a space map that spans multiple pages, which conceptually does not make a difference.

When an application requests the database management system to insert a data record into a table of the database, one or more space map pages that cover the table are accessed for choosing a suitable data page for insertion of the data record.

Some database management systems as for example the DB2 database management system from IBM Corporation use a so called clustering index in order to identify a data page into which a data record should be stored. The database management system attempts to insert the data record in the data page where adjacent key values already reside. Maintaining data records in the clustering key order enables more efficient data retrieval when the clustering index is used to retrieve a set of data records within a key range.

If there is no storage space available on the data page that is identified by use of the clustering index, it is preferable to insert the data record within close range of this data page. If the table is later accessed by use of a blocked read technique such as sequential prefetch, the inserted record would then still be read in the same input/output operation. If all data pages within close range cannot accommodate the new data record, allocated space is reused for insertion of the new data record if possible in order to avoid the growth of a table space. If the allocated space is optimally reused, insertion operations can often result in a scan of many if not all space map pages of the table space which is usually very time consuming.

The approach disclosed in the patent U.S. Pat. No. 6,668,263 basically describes a method which remembers the last set of space map pages that have been searched and limits the total amount of space searched when inserting a new record. In this way it is ensured that the performance of the database does not degrade too much. However, data pages with sufficient free space are found only if they are covered by the last set of space map pages that has been searched previously.

In the patent U.S. Pat. No. 6,334,134, a method for insertion of a data record in a parallel database system is disclosed. Distinct page ranges are assigned to the different instances of the database system. Each instance of the parallel database system inserts a new data record on those data pages only that are assigned to this instance and ignores the clustering index. It thereby avoids an overhead of the synchronization between the instances comprised in the parallel database system. However, the method does not provide an improved method for finding data pages that could accommodate new data records.

There is therefore a need for an improved method and data processing system for efficiently searching a data page that provides sufficient storage space for inserting a new data record.

SUMMARY OF THE INVENTION

In accordance with an embodiment of the invention, there is provided a method of searching a data page in a table space of a database for inserting a data record to a first table, wherein the table space comprises space map pages and sets of data pages, wherein each space map page comprises information about the available storage space of one set of data pages, wherein each space map page and the corresponding set of data pages is further assigned to a table range for each table to which at least one data page in the set of data pages belongs to, wherein the database further comprises a clustering index for the first table in the database management system, wherein the database management system comprises a space usage information database, and wherein the space usage information database holds space usage information for each table range. The method comprises the acts of receiving the data record and of searching a first data page of the set of data pages for insertion of the data record by use of the clustering index. If the first data page provides sufficient storage space, then the data record is stored in the first data page and the space usage information for the first table range to which the first data page is assigned to is updated. If the first data page does not provide sufficient storage space, then it is determined if the first table range provides sufficient storage space by use of the space usage information of the first table range. If the first table range provides sufficient storage space then the space map pages that are assigned to the first table range are searched for a second data page. The data record is stored in the second data page if there is sufficient free storage available and the space usage information for the first table range is updated. If the first table range does not provide sufficient storage space, then a second table range is identified by use of the space usage information comprised in the space information database. The space map pages of the sets of data pages that are assigned to the second table range are searched for a third data page. The data record is stored in the third data page and the space usage information for the second table range is updated. If no second table range is found with sufficient free space, then a fourth data page is allocated and the data record is stored in the fourth data page. The space usage information is updated after storing the data record in the fourth data page.

The database could be a database in general or a relational database. Correspondingly, a database management system could be a database management system in general as well as a relational database management system. The data record is generally received from an application which requests the database management system to insert the data record into the database. The first data page is searched within all of the allocated data pages of a table by use of the clustering index for the first data page. If the first data page does not provide sufficient free space for storing the data record, then it is determined from the space usage information if the table range to which the first data page is assigned to provides sufficient storage space. If this is the case, the space map pages assigned to the first table range are searched for a second data page. Usually, a second data page is only taken into account if it is within close range to the first data page, because of the advantages of accommodating the data record there. If the second data page provides enough storage space, then the data record is stored in the second data page. Otherwise, a second table range, typically the table range that provides the largest amount of free storage space, is identified by use of the space usage information. The space map pages of the second table range are searched in order to identify a third data page in which the data record is stored. If no second table range is identifiable, then a fourth data page is allocated. The fourth data page is typically allocated within a full set of data pages that is covered by a new space map page. The method in accordance with the invention is particularly advantageous as it provides a fast and efficient way to find a data page, which ensures that the size of the database does not grow disproportionately with respect to the actually used storage space.

In accordance with an embodiment of the invention, the table space comprises at least a first table and a second table, wherein several data pages are assigned to said first table and wherein several data pages are assigned to said second table, wherein only said data pages assigned to the first table are searched for inserting said data record, wherein said space usage information database lists the space usage information for each table range separately with respect to said first table and said second table. The table space could contain more than one table. The table space is shared between two tables, the first and the second table. A data page is assigned to the first table or the second table. Data pages that already have entries are exclusively assigned to one table while empty data pages are assigned to both tables. If a data record is supposed to be inserted to a table, only the data pages that are assigned to the corresponding table and empty data pages are searched. In this embodiment, only the data pages that are assigned to first table and empty pages are searched. At first, the clustering index of the first data page is used to search a first data page for inserting the data page. Then, the first table range is searched. The space usage information database lists the space usage information for each table range separately with respect to the first table and the second table. The space usage information of the first table could for example comprise an entry which contains the total free space of all data pages that are assigned to the first table and that are assigned to the first table range. Similarly, the space usage information of the first table could for example comprise an entry which contains the total free space of all data pages that are assigned to the second table and that are assigned to the first table range. When the data record is stored into a data pages which is initially empty the data pages becomes exclusively reserved for the first table. Hence both entries of the space usage information has to be updated since this data page is not longer assigned to the second table range and has the total storage available on the second table range decreased.

In accordance with an embodiment of the invention, the database further comprises a persistent space usage information database, and the method further comprises the acts of maintaining delta counters for each table range of the space usage information and of adding the delta counters to the persistent space usage information database periodically after a given period of time. The delta counters are maintained in memory. The values are externalized periodically to the persistent space usage information. The advantage of delta counters is that they reflect only the changes made to the space usage with respect to the last update. Thus, the persistent space usage information database can be updated simply by adding the values of the delta counters to the corresponding values stored in the space usage information database In accordance with an embodiment of the invention, the database further comprises a persistent space usage information database and the method further comprises the acts of maintaining delta counters for each table range of the space usage information and of adding the delta counters to the persistent space usage information database at a database management system checkpoint. The space usage information stored in the space usage information database reflects only the changes made to the space usage. The cost of maintaining the space usage information is then low, since only information is collected that can be updated at constant cost, e.g. by adding or subtracting new values. Nevertheless the space usage information that is collected per table range is fairly accurate.

In accordance with an embodiment of the invention, each table range refers to one set of data pages if the total number of table ranges does not exceed a maximum number of table ranges, and adjacent table ranges are merged into a new table range if the total number of table ranges exceeds the maximum number of table ranges, and the space usage information of the table ranges are merged into a new space usage information of the new table range.

In accordance with an embodiment of the invention, the space usage information for a table range to which a data page is assigned to is further updated when a data record is deleted or updated in the data page.

In accordance with an embodiment of the invention, the space usage information for a table range comprises the address of the first data page of the table range, the number of empty data pages comprised in the table range that can be used a table, the names of the tables, the number of data records with maximum length fitting in the table range, the number of records with average size fitting in the table range, the number of records with minimum size fitting in the table range, and the number of total storage space in bytes which is available in the table range for a table. The space usage information that is collected per table range is fairly accurate. For example, the number of records with minimum size that fit into a table range is recorded. As multiple data records with minimum length may fit on a single data page, this counter is more accurate than the space usage information that is hold on a space map page which refers to single data pages only. Space map pages usually indicate whether a record with minimum length fit on the corresponding data page but they do not indicate how many records.

In accordance with an embodiment of the invention, each table range refers to the set of data pages of a space map page that is used by a table or can potentially be used by it if the total number of table ranges does not exceed the maximum number of table ranges that is defined. If the maximum number of table ranges is reached for a table, then table ranges are merged.

In accordance with an embodiment of the invention, the second table range for a given data record length is the table range that provides the largest number of data pages that can contain records of the given length.

In accordance with an embodiment of the invention, the sufficient storage space provided by the first data page or by the first table range refers to storage space which is larger than the storage space required for storing the data record.

In another aspect the invention relates to a computer program product comprising computer executable instructions for performing a method in accordance with the invention.

In another aspect the invention relates to a data processing system for searching a data page in a table space of a database for inserting a data record to a first table. The table space comprises space map pages and sets of data pages wherein each space map page comprises information about the available storage space of one set of data pages and wherein the storage space in the corresponding set of data pages are further assigned to a table range and wherein the database further comprises a clustering index in the database management system, wherein the database management system comprises a space information database, wherein the space information database holds space usage information for each table range. The system further comprises means for receiving the data record, means for searching a first data page of the set of data pages for insertion of the data record by use of the clustering index for said first table, and means for storing the data record in the first data page and means for updating the space usage information for the first table range to which the first data page is assigned to. The data processing system further comprises means for determining if the first table range provides sufficient storage space by use of the space usage information for the first table range and means for searching the space maps which are assigned to the first table range for a second data page, means for storing the data record in the second data page and means for updating the space usage information of the first table range. The data processing system further comprises means for identifying a second table range by use of the space usage information, means for searching the space maps of the sets of data pages that are grouped into the second table range for a third data page, means for storing the data record in the third data page and means for updating the space usage information for the second table range. The data processing system further comprises means for allocating a fourth data page and means for storing the data record in the fourth data page.

BRIEF DESCRIPTION OF THE DRAWINGS

In the following preferred embodiments of the invention will be described in greater detail by way of example only making reference to the drawings in which.

DETAILED DESCRIPTION

Figure 1:
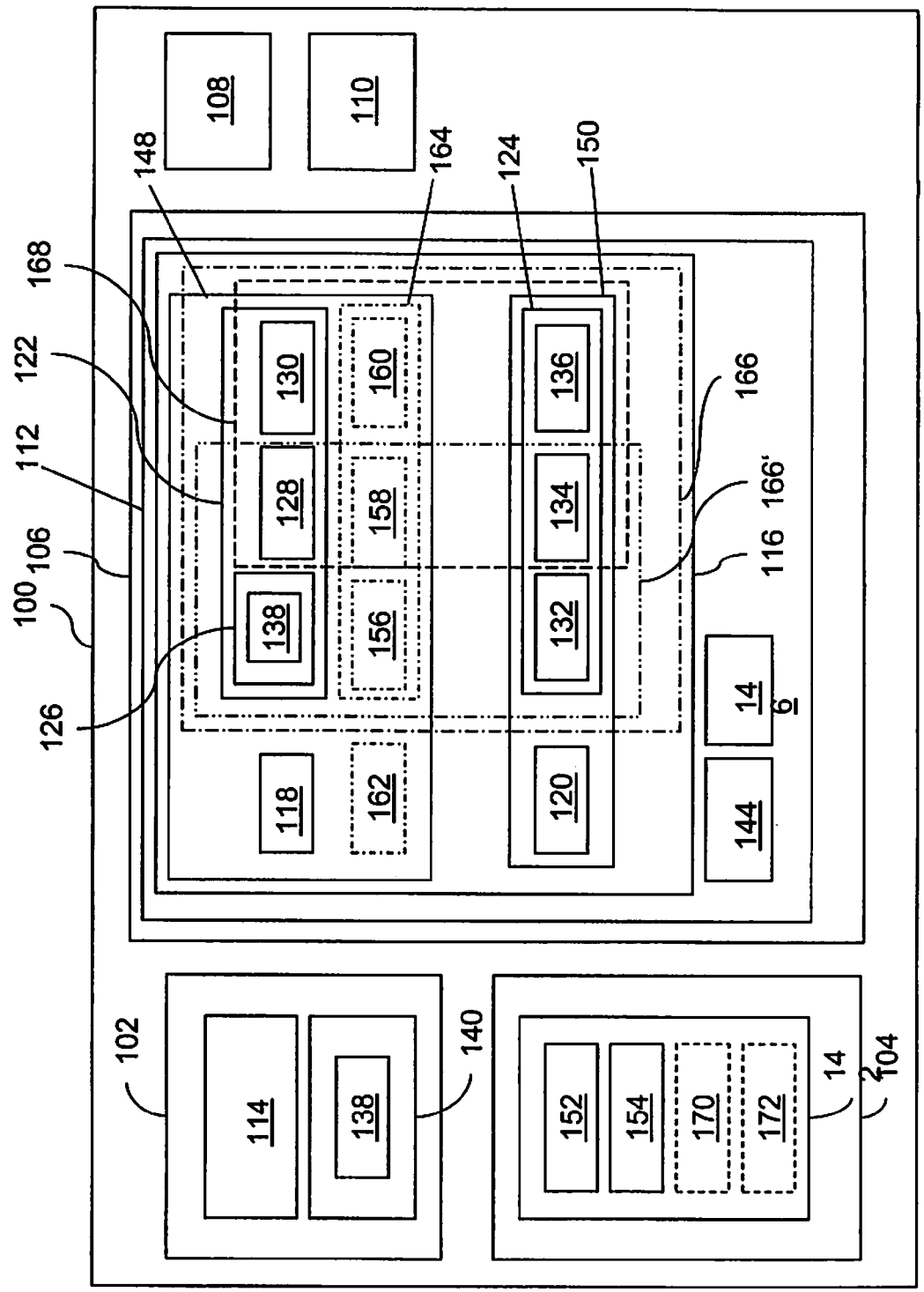
FIG. 1 is a block diagram of a computer system comprising a database system.

FIG. 1 shows a block diagram of a computer system 100 comprising a database system. The computer system 100 comprises a microprocessor 102, a volatile memory device 104, a non-volatile memory device 106, a screen 108, and an input device 110. The database system consists of a database 112 and of a database management system 114. The database 112 is stored on the non-volatile memory device 106. In the database 112, data of a table 166 is physically stored in a table space 116. A table space 116 consists of several data pages that are grouped into sets of data pages. In FIG. 1, the table space 116 comprises initially two sets of data pages 122 and 124. The set of data pages 122 comprises data page 126, 128, and 130 and the set of data pages 124 comprises data pages 132, 134, and 136. The table space 116 initially further comprises space map pages 118 and 120. The space map page 118 relates to the set of data pages 122 and provides information on the storage space that is used in the data pages 126, 128, and 130. The space map page 120 relates to the set of data pages 124 and provides information on the storage space that is used in the data pages 132, 134, and 136.

In order to avoid excessive updates being performed on the space map pages 118 and 120 and in order to maximize the number of data pages covered by a single space map page, each space map page maintains only a small number of values for each data page that approximate the amount of free space. A typical value in the space map page indicates whether a data record with maximum size fits on a data page. In the table space, a space map page usually precedes the data pages to which it relates to. Thus, the space map page 118 precedes physically the set of data pages 122 and the space map page 120 precedes physically the set of data pages 124.

The microprocessor 102 executes the database management system 114 and an application 140. The database management system 114 is designed to manage the database 112 by running operations such as insertion of a data record or deletion of a data record from the database 112. The operations are usually requested by another program, such as for example the application 140.

The application 140 can for example be a spreadsheet program. A user can for example insert a data record 138 to the spreadsheet program by use of the input device 110. The spreadsheet is visualized on the screen 108 so that the user has immediate control of what he or she is putting into the spreadsheet. For storing the data record 138, the application 140 interfaces with the database management system 114 and requests for example by use of SQL statements the database management system 114 to store the data record 138 in the database 112. The database management system 114 receives the data record 138. The database management system 114 uses the so called clustering index 144 in order to search for a first data page of the sets of data pages 122 and 124 that provides enough storage space for insertion of the data record 138. The clustering index 144 refers the first table 166. Thus with the clustering index all data pages that are covered by the first table 166 can be searched. Hence, the first data page might be any data page amongst data pages 126, 128, 130, 132, 134 and 136. For the following, it is assumed that the first data page identified by use of the clustering index 144 corresponds to data page 138. If the first data page 138 identified by use of the clustering index 144 provides sufficient storage space, then the data record 138 is stored in the first data page.

The data pages 126, 128, 130, 132, 134 and 136 as well as the space map pages 118 and 120 are also grouped into so called table ranges. Initially each set of data pages 122 or 124 is grouped along with the corresponding space map page 118 or 120 into one table range 148 or 150, respectively. The non-volatile memory device 104 holds a space information database 142. The space information database 142 holds space usage information 152 for the table range 148 and space usage information 154 for the table range 150. For each table range 148 or 150, the space usage information 152 or 154 holds information about the storage space which is available on the data pages of the set of data pages that are assigned to the table ranges 148 or 150. Thus, table range 148 comprises information about the available storage space on data page 126, 128, and 130. Table range 150 comprises information about the available storage space on data page 132, 134, and 136. Information comprised in the table range refers to table ranges in total. The information comprises for example the address of the first data page of the table range, which uniquely identifies the table range, the table name, the number of empty data pages comprised in a table range and that can be used by the table, the number of data records with maximum size that fit in the table range, the number of data records with average size that fit in the table range, the number of records with minimum size that fit in the table range, and the total available storage space within the table range in bytes.

As mentioned above, if the first data page 126 provides sufficient storage space, then the data record 138 is stored in the first data page 126. Additionally, the space usage information 152 of the corresponding table range 148 is updated. For example, the total available storage space stored for the table range 148 is changed in order to reflect the storage space taken by the data record 138.

If the first data page 126 does not provide sufficient storage space, then the space usage information 152 is scanned and it is checked if the table range 148, the one to which the first data page 126 is assigned to, provides sufficient storage space. If the table range 148 provides sufficient storage space, then the space map pages of the table range 148 are searched for a suitable data page. Usually, a suitable data page is only searched within the data pages that are within close range to the first data page. The only space map page that is comprised in table range 148 is space map page 118. Thus space map page 118 is searched for a second data page that provides enough storage space for storing data record 138, which might for example be data page 128. If a second data page 128 can be identified, the data record 138 is stored in the second data page 128 and the space usage information 152 is updated accordingly.

If the table range 148 does not provide sufficient storage space, then the space usage information of the table range that provides the largest amount of free storage space is identified. Thus, if table range 150 provides according to space usage information 154 more storage space than table range 148 for records of the length of the data record to be inserted, then the space map pages assigned to table range 150, which is in this example the space map page 120 is searched for a third data page, which might for example be data page 132. If the third data page 132 provides sufficient storage for storing data record 138, then the data record 138 is stored in the third data page 132 and the space usage information 154 is updated. If table range 150 does not provide more storage space than table range 148, then another data page 156 and another space map page 162 together with other data pages 158 and 160 that are covered by the space map page 162 are allocated in the table space 116. The space map page 162 together with the set of data pages 164 which comprises data pages 156, 158, and 160 are assigned to for example table range 148. The data record 138 is stored on data page 156 and the space usage information 152 is updated accordingly.

The non-volatile memory device 106 comprises further a persistent space usage information database 146. The space usage information 152 and 154 is periodically externalized to the persistent space usage information database 146. The space usage information 152 and 154 reflect the changes in storage space usage of the corresponding table ranges 148 and 150 since the space usage information 152 and 154 were externalized previously. In an embodiment of the invention, the space usage information 152 and 154 reflect the changes in storage space usage since the space usage information 152 and 154 have been externalized the last time to the persistent space usage information database 146. Thus the space usage information 152 and 154 is added to the corresponding values stored in the persistent space usage information database 146. The space usage information 152 and 154 are then delta counters. The change of space usage of the corresponding table ranges 148 and 150 is reflected in the space usage information 152 and 154. In another embodiment of the invention, the space usage information 152 and 154 comprises information about the absolute storage space which is available in the table ranges 148 and 150. The space usage information 152 and 154 is then periodically copied to the persistent space usage information database 146. The period for the externalization of the space usage information 152 and 154 can be specified by a given period of time which is set by a system administrator or can correspond to the time span between two database checkpoints.

The allocation of new storage space for example when the fourth data page 156 is created implies generally the creation of a set of data pages along with the corresponding space map page as has been described above by allocating the set of data pages 164 containing data pages 158 and 160 in addition to data page 156 and by allocating the space map page 162. The set of data pages 164 as well as the space map page 162 are typically allocated at the end of the table space 116.

Instead of assigning the new set of data pages 164 and the new space map page 162 to the existing table range 148, a new table range could be created to which the new set of data pages and the corresponding space map page could be assigned to.

If the total number of table ranges does not exceed a maximum number of table ranges, which can for example be set by the system administrator, then each table range refers to one set of data pages plus the corresponding space map page. If however the total number of table spaces exceeds a maximum number of table ranges, two adjacent table ranges are merged into one table range. Thus, for example, the table range 148 and the table range 150 are merged into one new table range. The space usage information 152 and 154 are combined into one new space usage information by summing the space usage 152 and 154. The address of the first data page of the table range with the lower address is preserved in the new space usage information.

The space usage information 152 and 154 are not only updated when a new data record is inserted. The space usage information 152 or 154 is also updated when a data record of the table range 148 or 150 is updated or deleted, respectively.

If two tables, the first table 166' and the second table 167 store their data records in table space 116, then a data page that holds already data records of one table is assigned to that table. If a data page is empty, it is shared by both tables. In the following, it is assumed that data page 126 and data page 132 is assigned to table 166'. It is furthermore assumed that data page 130 and data page 136 are assumed to table 168. It is also assumed as indicated in FIG. 1 that data pages 128 and 134 are assigned to both, to table 166' and to table 168, which implies that the data pages 128 and 134 are initially empty.

The space usage information list then the total free storage space that is available on each table of the table ranges separately. The space usage information 152 lists for example the total free storage space on the table range 148 per first table 166'. The space usage information 170 lists for example the total free storage space on the table range 148 and per second table 168. If for example a data record for the first table 166' is stored in the data page 128, then the space usage information 152 is updated. Since data page 128 becomes uniquely assigned to the first table 166', the total storage listed in the space usage information 170 for the second table 168 decreases by the amount of storage that has been provided by the data page 128, since this page is no longer assigned to the second table 168. Moreover, the total storage space storage listed in the space usage information 152 for the first table 166' decreases only by the amount used for storing the data record. Accordingly, the space usage information lists the total free storage space on the table range 150 per first table 166' and the space usage information 172 lists the total free storage space on the table range 150 per second table 168.

Figure 2:
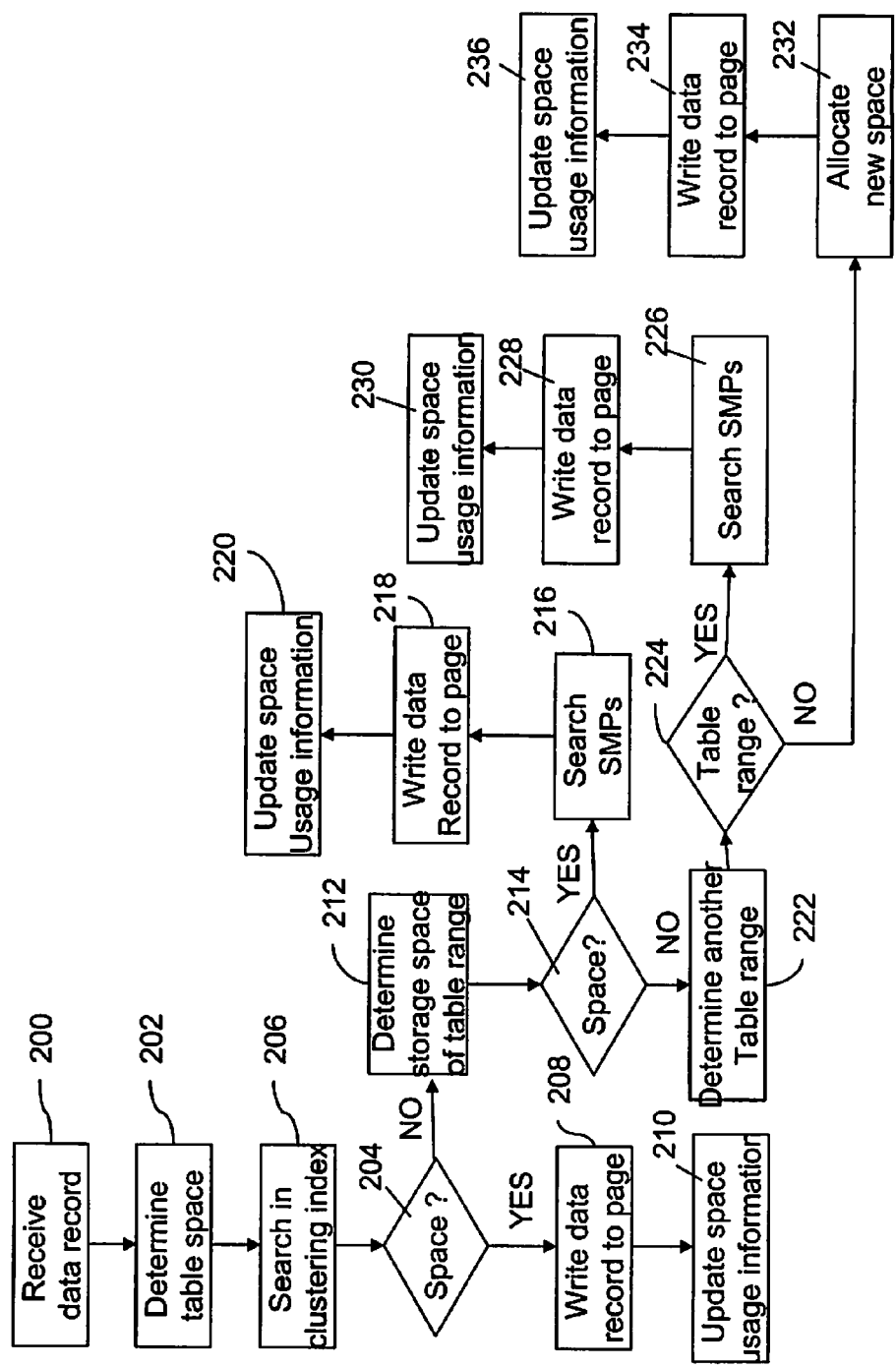
FIG. 2 is a flow diagram describing schematically the acts comprised by the method in accordance with the invention.

FIG. 2 depicts a flow diagram which describes schematically the acts comprised by the method in accordance with the invention for insertion of a data record. In block 200 the data record is received for example from an application which requests the insertion of the data record into the database. The physical object of the table, the table space, is determined in block 202. In block 206 the clustering index is searched for a suitable data page into which the data record might be inserted. In block 204, it is checked if the data page found by use of the clustering index provides sufficient storage space. If this is the case, the data record is added to the data page in block 208. In block 210, the space usage information of the table range to which the data page is assigned to is updated.

If, in block 204, it is found that the data page identified by use of the clustering index does not provide sufficient storage space, then the storage space information for the table range of the table to which the data page belongs to is determined in block 212. In block 214 it is determined if the storage space of the table range is sufficient for storing the data record in the data page of the table range. If there is enough storage space in the table range, then in block 216 the space maps comprised in the table range are searched for a suitable data page. Usually a data page is searched that is within close range of the data page found by use of the clustering index. In block 218 the data record is stored to the data page found in block 216 and in block 220 the space usage information of the table range is updated.

If in block 214 it is determined if the storage space of the table range is not sufficient for storing the data record in a data page of the table record, then the table range that provides the most free storage space is identified. In block 224 it is decided if the storage space provided by the table range is sufficient for storing the data record. If this table range provides sufficient storage space then in block 226 the space map page of this table range are searched for a suitable data page. The data record is stored in the data page found previously in block 228 and the space usage information of the corresponding table range is updated in block 230.

If in block 224 the table range identified in block 222 does not provide sufficient storage space, then a new data page and a new space map page along with the other data pages to be covered by the new space map page are allocated in block 232. The data record is written to the storage space in block 234 and in block 236 the space usage information is updated.

LIST OF REFERENCE NUMERALS

100 Computer system
102 Microprocessor
104 Volatile memory device
106 Non-volatile memory device
108 Screen
110 Input device
112 Database
114 Database management system
116 Table space
118 Space map page
120 Space map page
122 Set of data pages
124 Set of data pages
126 Data page
128 Data page
130 Data page
132 Data page
134 Data page
136 Data page
138 Data record
140 Application
142 Space usage information database
144 Clustering index
146 Persistent space usage information database
148 Table range
150 Table range
152 Space usage information
154 Space usage information
156 Data page
158 Data page
160 Data page
162 Space map page
164 Set of data pages
166 First table
166' First table
168 Second table
170 Space usage information
172 Space usage information

The invention claimed is:

1. A method of searching a data page in a table space of a database for inserting a data record to a first table, said table space comprising space map pages and sets of data pages, said method comprising:

a) receiving said data record at a database, wherein said database comprises a clustering index for said first table and a database management system, and wherein said database management system comprises a space usage information database;

b) searching a first data page of the sets of data pages for insertion of said data record by use of said clustering index;

c) if said first data page provides sufficient storage space, then storing said data record in said first data page and updating said space usage information for a first table range to which said first data page is assigned to;

d) if said first data page does not provide sufficient storage space, then determining if said first table range provides sufficient storage space by use of said space usage information of said first table range;

e) if said first table range provides sufficient storage space, then searching the space map pages being assigned to said first table range for a second data page, storing said data record in said second data page, and updating said space usage information of said first table range;

f) if said first table range does not provide sufficient storage space, then identifying a second table range by use of the space usage information, searching the space map pages of the sets of data pages being grouped into said second table range for a third data page, storing said data record in said third data page, and updating said space usage information for said second table range;

g) if no second table range is identifiable, then allocating a fourth data page, storing said data record in said fourth data page, and updating said space usage information;

wherein said table space comprises at least a first table and a second table, wherein several data pages are assigned to said first table and wherein several data pages are assigned to said second table, wherein only said data pages assigned to the first table are searched for inserting said data record, wherein said space usage information database lists the space usage information for each table range separately with respect to said first table and said second table;

wherein said database further comprises a persistent space usage information database, and wherein said method further comprises:

maintaining delta counters for each table range of the space information; and adding said delta counters to said persistent space usage information database periodically after a given period of time;

adding said delta counters to said persistent space usage information database at a database management system checkpoint;

whereby the delta counters reflect changes made to the space usage with respect to a last update;

wherein the space usage information for a table range to which data pages are assigned to is further updated when a data record is deleted or updated in anyone of said data pages; and wherein said space usage information of a table range comprises the address of the first data page of said table range, the names of the tables, the number of empty data pages comprised in said table range that can be used by a table, the number of data records with maximum length fitting in said table range, the number of records with average size fitting in said table range, the number of records with minimum size fitting in said table range, and the number of total storage space in bytes being available in said table range for said table.

2. The method according to claim 1, wherein each table range refers to one set of data pages of a space map page if the total number of table ranges does not exceed a maximum number of table ranges, and wherein adjacent table ranges are merged into a new table range if the total number of table ranges exceeds the maximum number of table ranges, and wherein the space usage information of the table ranges are merged into a new space usage information of the new table range.

3. The method according to claim 2, wherein said second table range is the table range providing the largest amount of storage space of all table ranges for a given data record length.

4. The method according to claim 3, wherein said sufficient storage space provided by said first data page or by said first table range refers to storage space being larger than the storage space required for storing said data record.

5. A computer program product comprising computer executable instructions for performing the method of claim 1.

6. A data processing system, comprising:

a) a database comprising a space map page containing information about the available storage space in a set of data pages, wherein the space map page and the set of data pages are assigned to a table range;

b) a database management system that:

1) identifies a first data page for insertion of a data record and, if said first data page provides sufficient storage space: stores the data record in the first data page and updates said space usage information for a first table range to which the first data page is assigned;

2) if said first data page does not provide sufficient storage space: determines whether the first table range provides sufficient storage space by use of the space usage information of said first table range; and (i) if the first table range provides sufficient storage space: searches the space map pages being assigned to the first table range for a second data page, stores the data record in the second data page, and updates the space usage information of the first table range;

(ii) if said first table range does not provide sufficient storage space: identifies a second table range by use of the space usage information, searches the space map pages of the sets of data pages being grouped into the second table range for a third data page, stores the data record in the third data page, and updates the space usage information for the second table range;

wherein said table space comprises at least a first table and a second table, wherein several data pages are assigned to said first table and wherein several data pages are assigned to said second table, wherein only said data pages assigned to the first table are searched for inserting said data record, wherein said space usage information database lists the space usage information for each table range separately with respect to said first table and said second table;

wherein said database further comprises a persistent space usage information database, and wherein said method further comprises:

maintaining delta counters for each table range of the space information; and adding said delta counters to said persistent space usage information database periodically after a given period of time;

adding said delta counters to said persistent space usage information database at a database management system checkpoint;

whereby the delta counters reflect changes made to the space usage with respect to a last update;

wherein the space usage information for a table range to which data pages are assigned to is further updated when a data record is deleted or updated in anyone of said data pages; and wherein said space usage information of a table range comprises the address of the first data page of said table range, the names of the tables, the number of empty data pages comprised in said table range that can be used by a table, the number of data records with maximum length fitting in said table range, the number of records with average size fitting in said table range, the number of records with minimum size fitting in said table range, and the number of total storage space in bytes being available in said table range for said table.

7. The data processing system according to claim 6, wherein each table range refers to one set of data pages of a space map page if the total number of table ranges does not exceed a maximum number of table ranges, and wherein two adjacent table ranges are merged into a new table range if the total number of table ranges exceeds a maximum number of table ranges, and wherein the space usage information of the table ranges are merged into a new space usage information of the new table range.

8. The data processing system according to claim 7, wherein said second table range is the table range providing the largest amount of storage space of all table ranges for a given data record length.

9. The data processing system according to claim 8, wherein said sufficient storage space provided by said first data page or by said first table range refers to storage space being larger than the storage space required for storing said data record.

10. The method according to claim 1, wherein:
    each space map page comprises information about the available storage space of one set of data pages, each space map page and the corresponding set of data pages being further assigned to a table range; and
    said space usage information database holds space usage information for each table range.

11. The data processing system according to claim 6, wherein:
    each space map page comprises information about the available storage space of one set of data pages, each space map page and the corresponding set of data pages being further assigned to a table range; and
    said space usage information database holds space usage information for each table range.

* * * * *